M. G. DOBBINS.
SOAP BUBBLE BLOWER.
APPLICATION FILED JAN. 20, 1920.
1,359,342.
Patented Nov. 16, 1920.
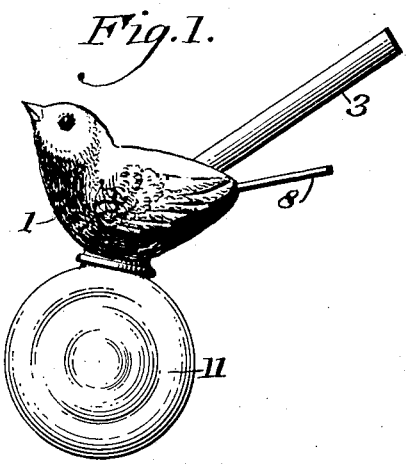
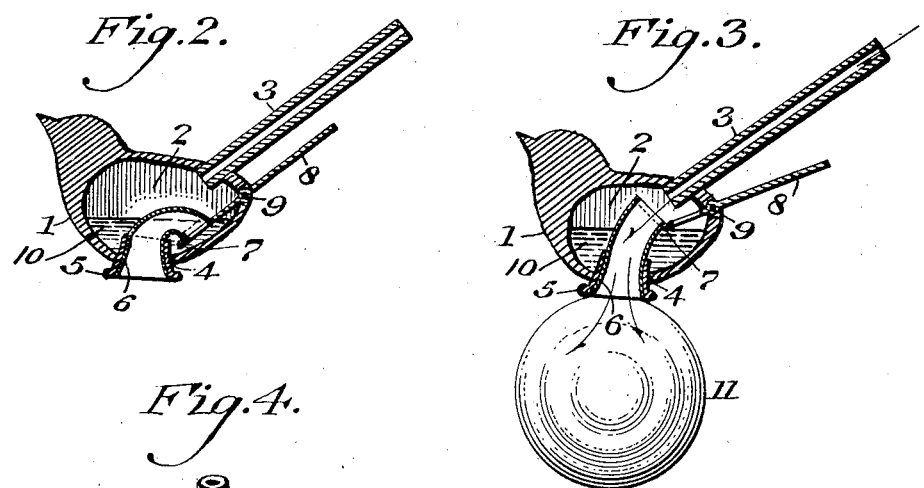
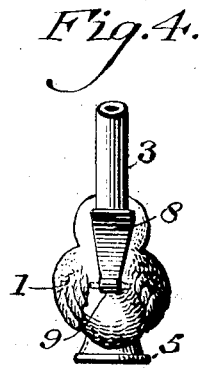
INVENTOR
Michael G. Dobbins
BY
ATTORNEYS

UNITED STATES PATENT OFFICE.

MICHAEL G. DOBBINS, OF PHILADELPHIA, PENNSYLVANIA.

SOAP-BUBBLE BLOWER.

1,359,342.  Specification of Letters Patent.  Patented Nov. 16, 1920.

Application filed January 20, 1920. Serial No. 352,776.

*To all whom it may concern:*

Be it known that I, MICHAEL G. DOBBINS, a citizen of the United States, residing in the city and county of Philadelphia, State of Pennsylvania, have invented a new and useful Soap-Bubble Blower, of which the following is a specification.

My present invention comprehends a novel construction of a soap bubble blower wherein the casing which forms a combined liquid and air pressure reservoir is preferably shaped in the form of some animal such as, for example, a bird.

It further comprehends a novel soap bubble blower wherein the mouth of the blower is formed by a flexible tube which extends into the reservoir which contains the liquid and novel means are provided which are preferably indicative of the tail of a bird or other animal to cause the inner end of the flexible tube to be dipped into the liquid to cause a portion of the liquid to adhere thereto and then by the actuation of the tail piece the inner end of the flexible tube is brought into proper relation with respect to the blowing tube so that a bubble can be blown.

Other novel features of construction and advantage will hereinafter more clearly appear in the detailed description of my invention.

For the purpose of illustrating my invention, I have shown in the accompanying drawing a typical embodiment thereof which is at present preferred by me, since said embodiment will be found in practice to give satisfactory and reliable results. It is, however, to be understood that the various instrumentalities of which my invention consists can be variously arranged and organized and that my invention is not limited to the precise arrangement and organization of these instrumentalities as herein shown and described.

Figure 1 represents, in side elevation, a soap bubble blower, embodying my invention, and showing in addition a soap bubble as having been formed.

Fig. 2 represents, in sectional elevation, a soap bubble blower as it appears at one stage of the operation.

Fig. 3 represents, in sectional elevation, the construction seen in Fig. 2, but showing the parts in the position which they assume when the bubble is being blown and showing in addition a bubble in the process of formation.

Fig. 4 represents an end elevation of my device.

Similar numerals of reference indicate corresponding parts.

Referring to the drawings.

1 designates a casing which may have any desired contour but which is preferably representative of a bird or other animal and is provided with an interior chamber 2 which forms a combined air reservoir and a liquid reservoir.

3 designates the blow tube which passes through the casing or body portion 1 so as to communicate with the reservoir 2 therein and the blow tube 3 is secured in position in any desired or conventional manner.

The reservoir 2 is provided with an opening 4 preferably located in its bottom portion and in which is secured in any desired manner a tube 5 which is preferably funnel-shaped and has its inner open end extending above the bottom of the reservoir 2 and its lower end flaring outwardly and extending below the bottom of the casing 1.

Secured in any desired manner within this funnel-shaped member 5 is a flexible tube 6 the upper end of which extends above the surface of the liquid in the reservoir 2. The upper end of this open ended tube 6 is provided with a reinforcement 7 of any desired nature to which is connected one end of a lever 8, said lever being fulcrumed at 9 in the casing 1 and passing through said casing so that its outer end serves as a handle to operate the flexible tube 6.

The outer end of the lever 8 is preferably formed in such a manner that it represents the tail of the animal.

10 designates the liquid in the reservoir 2 and 11 designates the soap bubble.

The operation of my novel soap bubble blower will now be readily apparent to those skilled in the art and is as follows:—

The liquid such as, for example, soapy water for blowing bubbles is placed within the reservoir 2 preferably through the flexible tube 6.

In the normal position of the parts the inner open end of the flexible tube 6 is above the surface of the liquid 10 in the combined air and liquid reservoir 2. When the operator desires to blow a bubble he moves the lever 8 upwardly thereby causing the inner open end of the flexible tube 6 to move into the position seen in Fig. 3 and it is thereafter moved into the position seen in Fig. 2.

The operator now blows through the blow tube 3 thereby causing the bubble 11 to be formed, as is evident.

The flexible tube 6 preferably consists of an open ended rubber tube secured in any desired manner with respect to the tubular member 5 secured to the casing.

It will now be apparent that I have devised a novel and useful construction of a soap bubble blower which embodies the features of advantage enumerated as desirable in the statement of the invention and the above description, and while I have, in the present instance, shown and described a preferred embodiment thereof which will be found in practice to give satisfactory and reliable results, it is to be understood that such embodiment is susceptible of modification in various particulars without departing from the spirit or scope of the invention or sacrificing any of its advantages.

Having thus described my invention, what I claim as new and desire to secure by Letters Patent, is:—

1. A soap bubble blower, comprising a casing, a combined air and liquid reservoir, a blow tube communicating with said reservoir, an open ended flexible tube having one end opening exterior of the casing and the other end opening into said reservoir above the liquid, and means to deflect the inner open end of said open ended tube to move it into the liquid and into blowing position with respect to said blow tube.

2. A soap bubble blower, comprising a casing having a combined air and liquid reservoir, a blow tube communicating with said reservoir, an open ended tube having one end terminating exterior of said casing and the other end within the casing above the level of the liquid therein, and means movably carried by said casing to actuate said tube to cause it to receive a film of the liquid and to move it into blowing position.

3. A soap bubble blower, comprising a casing having a combined air and liquid reservoir, a blow tube communicating with said reservoir, an open ended tube having one end opening through said casing and the other end extending above the level of the liquid in said reservoir, and a lever pivoted to said casing and connected with said tube to cause its inner open end to be brought into contact with said liquid and to be moved into blowing position with respect to said blow tube.

4. A soap bubble blower, comprising a casing having a combined air and liquid reservoir, a blow tube communicating with said reservoir, an open ended tube having one end opening through said casing and the other extending into said reservoir, a reinforcement for the inner open end of said open ended tube, and means connected with said reinforcement to actuate said open ended tube to cause it to receive a film of liquid and to move it into blowing position.

5. In a soap bubble blower, a casing having the configuration of an animal and provided with a combined air and liquid reservoir, a blow tube communicating with said reservoir, an open ended tube carried by said casing having its discharge end opening through said casing and having its inner end extending within said reservoir, and a member having the configuration of the tail of an animal connected to the inner end of said open ended tube to actuate it to cause it to receive a film of liquid and to move it into blowing position.

6. A soap bubble blower, comprising a casing having the configuration of a bird and provided with a combined air and liquid reservoir, a blow tube communicating with said reservoir, an open ended tube having its inlet end within said reservoir and its discharge end opening through said casing, and a tail piece indicative of the tail of a bird operatively connected with the inner end of said tube to move it into position to receive a film of liquid and to move it into blowing position.

MICHAEL G. DOBBINS.

Witnesses:
H. S. FAIRBANKS,
C. D. McVAY.